(12) United States Patent
Forster et al.

(10) Patent No.: US 12,228,436 B2
(45) Date of Patent: Feb. 18, 2025

(54) SIGNAL PROCESSING

(71) Applicant: Titan Enterprises Ltd, Sherborne (GB)

(72) Inventors: Trevor Forster, Sherborne (GB); Jeffrey Evemy, Sherborne (GB)

(73) Assignee: Titan Enterprises Ltd, Sherborne (GB)

( * ) Notice: Subject to any disclaimer, the term of this patent is extended or adjusted under 35 U.S.C. 154(b) by 458 days.

(21) Appl. No.: 17/616,662

(22) PCT Filed: Jun. 5, 2020

(86) PCT No.: PCT/EP2020/065691
§ 371 (c)(1),
(2) Date: Dec. 5, 2021

(87) PCT Pub. No.: WO2020/245401
PCT Pub. Date: Dec. 10, 2020

(65) Prior Publication Data
US 2022/0236090 A1 Jul. 28, 2022

(30) Foreign Application Priority Data
Jun. 7, 2019 (GB) ...................................... 1908158

(51) Int. Cl.
*G01F 1/667* (2022.01)
*G01F 1/66* (2022.01)

(52) U.S. Cl.
CPC .............. *G01F 1/667* (2013.01); *G01F 1/662* (2013.01)

(58) Field of Classification Search
CPC .......... G01F 1/667; G01F 1/662; G01F 25/10; G01F 1/66; G01P 5/248
See application file for complete search history.

(56) References Cited

U.S. PATENT DOCUMENTS

| 2004/0123673 | A1 | 7/2004 | Moscaritolo |
| 2009/0158858 | A1 | 6/2009 | Gysling |
| 2010/0011880 | A1* | 1/2010 | Keilman ................. G01F 1/66 73/861.28 |
| 2012/0271569 | A1 | 10/2012 | Wilson |
| 2018/0335330 | A1 | 11/2018 | Gestner |

FOREIGN PATENT DOCUMENTS

WO     WO 2018/017902 A2     1/2018

* cited by examiner

*Primary Examiner* — Matthew G Marini
*Assistant Examiner* — Leo T Hinze
(74) *Attorney, Agent, or Firm* — Shumaker & Sieffert, P.A.

(57) ABSTRACT

The disclosure relates to determination of a flow rate of a fluid flowing through a conduit, whilst compensating for conduit-borne interference. Transducers are used to emit ultrasonic signals into the fluid and receive the signal after propagating through a section of the conduit. Waves that have propagated through the fluid are detected and noise from pipe-borne interference is removed via signal processing.

17 Claims, 9 Drawing Sheets

SIGNAL PROCESSING

TECHNICAL FIELD

Aspects relate, in general, to determination of a flow rate of a fluid flowing through a conduit, and more particularly, although not exclusively to use of transducers to emit an ultrasonic signal into the fluid and receive the signal after propagating through a section of the conduit.

BACKGROUND

The extraction of flow, flow rate or fluid velocity from transit time ultrasonic signals is well known. There are a variety of existing techniques or algorithms to that can be used to extract time of flight data. For example, phase or envelope-based algorithms could be used to extract time of flight data. Similarly, peak-estimation algorithms allow efficient time-domain calculations to extract amplitude ratios and thereby flow in the absence of, or negligible, conduit-borne interference, thereby abrogating the need for picosecond measurement accuracy.

SUMMARY

According to a first aspect there is provided a method for determining a flow rate of a fluid in a conduit, the method comprising providing a first ultrasonic transit time signal under fluid flow, generated using a first transducer in a direction towards a second transducer, providing a second ultrasonic transit time signal under fluid flow, generated using the second transducer in a direction towards the first transducer, the first and second transducers being spatially separated from one another along a length of the conduit, providing a third ultrasonic transit time signal under zero fluid flow, generated using the first or second transducer in a direction towards the second or first transducer, generating respective measures of amplitude and phase of the first, second and third signals at a selected time to provide respective first, second and third flow vectors, calculating a measure of the difference in the values of amplitude and phase of the first signal and second signals at the selected time using the first and second flow vectors to provide a difference vector, generating a measure for a component of an interference vector representing a conduit-borne component signal of the first and second signals using the first and second flow vectors and the difference vector, and generating a measure for the flow rate of the fluid using the component of the interference vector, the third flow vector and the sum of the first and second vectors.

Generating the measure for the flow rate of the fluid may further comprise using the difference vector. The first and/or second signal may comprise the conduit-borne component signal and a pure fluid component. The third flow vector may comprise a pure fluid component and no conduit-borne component signal. The conduit-borne component signal may correspond to an ultrasonic wave that has propagated through the conduit itself and has not propagated through the fluid. The pure fluid component may correspond to an ultrasonic wave that has propagated through the fluid within the conduit. The difference vector may indicate the flow rate of fluid in the conduit affected by the conduit-borne component signal.

Generating a measure for the component of the interference vector may comprise using the equation:

$$m_y = -\frac{|U|^2 - |D|^2}{2\Delta}$$

where
$m_y$ is the component of the interference vector,
U is the first flow vector,
D is the second flow vector, and
$\Delta$ is the difference vector.

Generating a measure for the flow rate of the fluid may comprise using the equation:

$$s = \sqrt{|Z|^2 - m_y^2} - \sqrt{\left(\frac{|\sum|}{2}\right)^2 - m_y^2}$$

where
Z is the third flow vector,
$m_y$ is the imaginary component of the interference vector,
$\Sigma$ is a sum vector passing through the intersection of the difference vector with the real axis, and
s is a sagitta equal to the difference between the sum vector $\Sigma/2$ and the third vector.

Generating a measure for the flow rate of the fluid may comprise using the equation:

$$\Phi_t = 4 \cdot \arctan\left(\frac{2s}{\Delta}\right)$$

where
$\Delta$ is the difference vector,
s is a sagitta equal to the difference between a sum vector $\Sigma/2$ and the third vector,
wherein the sum vector $\Sigma$ passes through the intersection of the difference vector with the real axis, and
$\Phi_t$ is the flow rate of the fluid.

Generating a measure for the flow rate of the fluid may comprise using the equation:

$$r = -\frac{s^2 - \left(\frac{|\Delta|}{2}\right)^2}{2s}$$

where
$\Delta$ is the difference vector (418),
s is a sagitta (480) equal to the difference between the sum vector $\Sigma/2$ and the third flow vector (410), and
r is a radius (462) linked with the sagitta (480), where the radius (462) represents an amplitude of the fluid flow.

The method may further comprise performing synchronous demodulation on the first signal and/or second signal.

According to a second aspect there is provided an apparatus for determining a flow rate of a fluid in a conduit, the apparatus comprising a conduit, a first transducer configured to provide a first ultrasonic transit time signal, a second transducer configured to provide a second ultrasonic transit time signal, wherein the first a second transducers are spatially separated from one another along a length of the conduit and are further configured to provide a third ultrasonic transit time signal, a signal generator, a processor, configured to generate respective measures of amplitude and phase of the first, second and third signals at a selected time to provide respective first, second and third flow vectors, calculate a measure of the difference in the values of amplitude and phase of the first signal and second signals at the selected time using the first and second flow vectors to provide a difference vector, generate a measure for a component of an interference vector representing a conduit-borne component signal of the first and second signals using the first and second flow vectors and the difference vector, and generate a measure for the flow rate of the fluid using the component of the interference vector, the third flow vector and the sum of the first and second vectors. The processor may be configured to perform the method according to the first aspect.

According to a third aspect there is provided a non-transitory machine-readable storage medium encoded with instructions executable by a processor for determining a flow rate of a fluid in a conduit, the machine-readable storage medium comprising instructions to generate respective measures of an amplitude and phase of a first, second and third signals at a selected time to provide respective first, second and third flow vectors, calculate a measure of the difference in the values of amplitude and phase of the first signal and second signal at the selected time using the first and second flow vectors to provide a difference vector, generate a measure for a component of an interference vector representing a conduit-borne component signal of the first and second signals using the first and second flow vectors and the difference vector, and generate a measure for the flow rate of the fluid using a component of an interference vector, the third flow vector and a sum of the first and second vectors.

According to a fourth aspect, there is provided a method for determining a flow rate of a fluid in a conduit, the method comprising detecting a first ultrasonic transit time signal under fluid flow, generated using a first transducer in a direction towards a second transducer, detecting a second ultrasonic transit time signal under fluid flow, generated using the second transducer in a direction towards the first transducer, the first and second transducers being spatially separated from one another along a length of the conduit, determining a measure of a difference in phase between the first and second ultrasonic transit time signals at a selected time, and on the basis of the determined measure of difference in phase, determining the flow rate of the fluid. The method can further comprise generating a representation of phase of a signal at the selected time, and using the representation, calculating a measure of the flow rate at the selected time. The method can further comprise sampling the first and second signals at the selected time to provide first and second samples, and using the first and second samples, calculating measures for the phase of the first and second signals at the selected time.

BRIEF DESCRIPTION OF THE DRAWINGS

Embodiments will now be described, by way of example only, with reference to the accompanying drawings, in which.

DESCRIPTION

Figure 1:
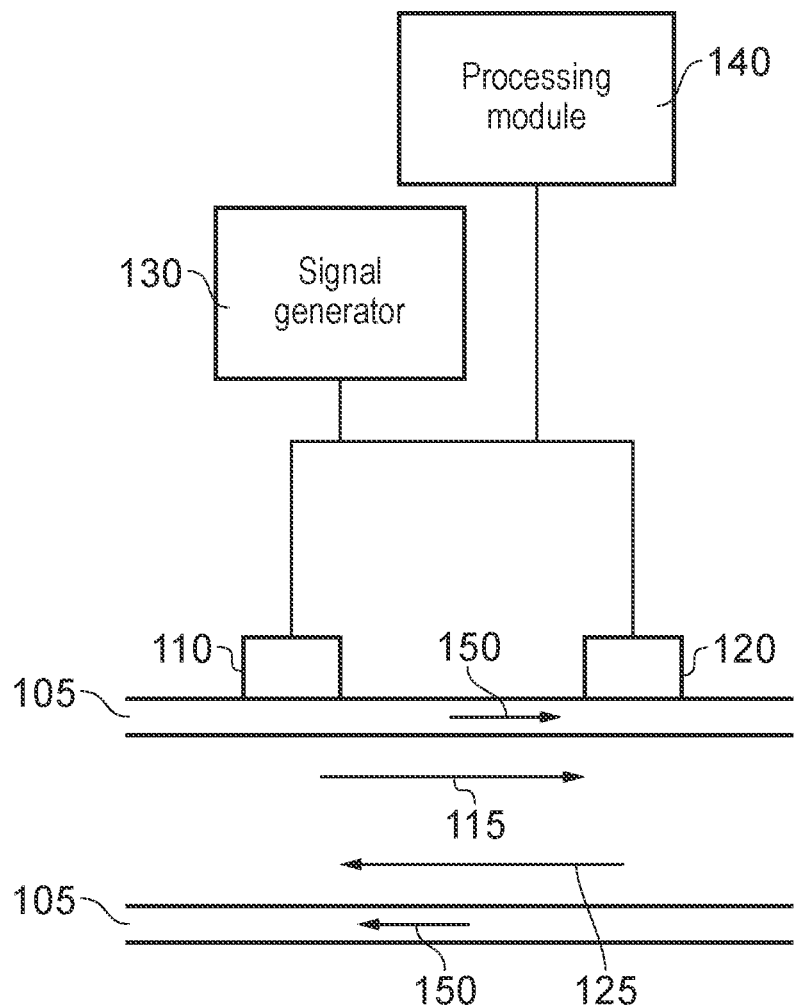
FIG. 1 shows a schematic of an apparatus for determining a flow rate of a fluid in a conduit according to an example.

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

There is provided an apparatus and method for determining a flow rate of a fluid in a conduit using transducers that are spatially separated from one another along the conduit. It is an object of the invention to process detected signals in order to remove interference. There is described a signal processing method to remove interference from the detected signals.

Interference or noise can arise originate from the conduit itself or unwanted reflections from, for example, pipe fittings. This interference is referred to as a conduit-borne component of the detected signal, where the detected signal is considered to be distorted by the conduit-borne interference. The signal processing methods described herein aim to remove pipe-borne interference and hence improve the accuracy of flow rate measurements by deriving a pure fluid component of the detected signal, where the pure fluid component is considered to be an undistorted (clean) signal.

In general, where reference is made to a detected signal this corresponds to an experimentally measured signal. Where reference is made to a derived signal this corresponds to a mathematically derived signal which is the signal processing of the detected signal.

Each detected signal and derived signal may comprise a conduit-borne component and a pure fluid component. The conduit-borne component of the signal may correspond to an ultrasonic wave that has propagated through the conduit itself (and may not have propagated through the fluid). The pure fluid component may correspond to an ultrasonic wave that has propagated through the fluid within the conduit (and may not have propagated through the conduit).

Fluid is determined to flow through the conduit if the fluid has a rate of flow.

FIG. 1 is a schematic of an apparatus for determining a flow rate of a fluid in a conduit according to an example. The apparatus comprises a conduit 105 or pipe through which a fluid may flow, for example water. There is provided at least one pair of transducers. For example, a first transducer 110 and second transducer 120 are spatially separated from one another along a length of the conduit.

The first transducer is configured to provide a first ultrasonic transit time signal 115 that is detected by the second transducer. The second transducer is configured to provide a second ultrasonic transit time signal 125 that is detected by the first transducer. When the first transducer is used to emit an ultrasonic signal whilst fluid is flowing through the conduit, the signal is received and detected by the second transducer, where this received signal is referred to as the first ultrasonic signal. When the second transducer is used to emit an ultrasonic signal whilst fluid is flowing through the conduit, the signal is received and detected by the first transducer, where this received signal is referred to as the second ultrasonic signal. As such, the pair of transducers are used to emit an ultrasonic signal in both respective directions along the length of conduit at which the pair of transducers are located.

When the first and/or second transducers are used to emit an ultrasonic signal whilst fluid is not flowing through the conduit, i.e. when the fluid has a zero flow rate, this is referred to as a third ultrasonic transit time signal which is measured under zero flow. The third ultrasonic signal may be detected with fluid present in the conduit but where there is no net flow of the fluid, i.e. the fluid is not flowing through the conduit.

The signal processing method described herein processes the detected first, second and third signals to derive an interference component. The derived interference component is then removed from the detected first, second and third signals to provide a more accurate measurement of flow rate having compensated for the effects of interference on the detected signals.

Each of the detected signals are comprised of a fluid signal component (fluid-borne signal) and an interference signal component (conduit-borne signal). As each of the ultrasonic signals traverse the conduit, the signals emitted by each transducer are modified by the flow rate of the fluid and noise from sources of interference. As such, when the signal is detected at the other transducer of the pair, the signal comprises a component corresponding to actual fluid flow and a component corresponding to interference.

According to an example, the component of the detected signal that corresponds to the interference signal can arise from conduit-borne noise 150. This conduit-borne signal interferes with the pure fluid signal. For example, consider a steel conduit with a fluid (e.g. water), where the time of arrival of an ultrasonic signal is predicted by the speed of sound in the fluid. The speed of longitudinal waves in steel are two to three times faster than in the fluid but this is not true of transverse waves. For transverse waves, reflections from the end fittings and group delay in setting up oscillations in the steel are taken into consideration in order for it to be possible to calculate a correct coincident arrival time of the transverse waves.

There are some assumptions to be made regarding the measurement system and the conduit-borne noise:

The system is linear: the principle of superposition applies throughout and the detected signals may be accurately modelled by the concept of a fluid signal and additive noise from the conduit.

None of the system is dispersive: there are phase shifts and amplitude changes but no changes in the frequency involved for each signal.

The first and second signals are identical at zero flow: not only assured by the principle of reciprocity but reflected in experimental observations, i.e. it is also assumed that the fluid signal components and the interference signal components of the detected signals are respectively identical under zero flow.

The fluid component of the first and second signals are identical in amplitude and form: it is noted that this is not strictly true as there are issues of attenuation and apparent path length under flow, however these are second order effects which will be ignored herein.

The conduit-borne interference signal is 'stable' over the timescales of the ultrasonic measurements. This is apparent from experimental observations, whereby changes associated with temperature and fluidic fluctuations are factors which take several seconds or minutes to occur and are therefore ignored herein.

The path of the interference signal is entirely outside the fluid, i.e. the conduit-borne signal has not passed through the fluid. Whilst it is possible to check that the interference signal does not pass through a fixed section of fluid (such as a reflection from the end fittings, by checking it is not affected by the end fittings), it may be less clear whether the interference signal has travelled through the fluid for any part of its history.

The first and second transducers are driven by a signal generator 130. The first and second transducers are in communication with, or connected to, a processing module 140 comprising a processor for processing the detected signals according to examples described herein.

Examples of detected signals under zero flow will be described with reference to FIGS. 2A and 3A. According to an example, the first and second transducers are spatially separated from one another along a length of the conduit. The first transducer is configured to emit the first ultrasonic transit time signal along the length of the conduit towards the second transducer under zero fluid flow. After the first ultrasonic signal has travelled along the section of the conduit the first signal is received at the second transducer. Similarly, the second transducer is configured to emit the second ultrasonic transit time signal along the length of the conduit towards the first transducer under zero fluid flow. After the second ultrasonic signal has travelled along the section of the conduit the second signal is received at the first transducer.

Examples of detected signals in the presence of a flow will be described with reference to FIGS. 2B and 3B. According to an example, the first and second transducers are spatially separated from one another along a length of the conduit. The first transducer is configured to emit the first ultrasonic transit time signal along the length of the conduit towards the second transducer under a flow of fluid through the conduit. After the first ultrasonic signal has travelled along the section of the conduit the first signal is received at the second transducer. Similarly, the second transducer is configured to emit the second ultrasonic transit time signal along the length of the conduit towards the first transducer under a flow of fluid through the conduit. After the second ultrasonic signal has travelled along the section of the conduit the second signal is received at the first transducer.

According to an example, more than two transducers may be provided for redundancy. For example, further pairs of transducers may be spatially separated along different lengths or sections of the conduit. This can provide an indication of fluid flow at different sections of the conduit between the regions at which the transducers are located.

Figure 2A:
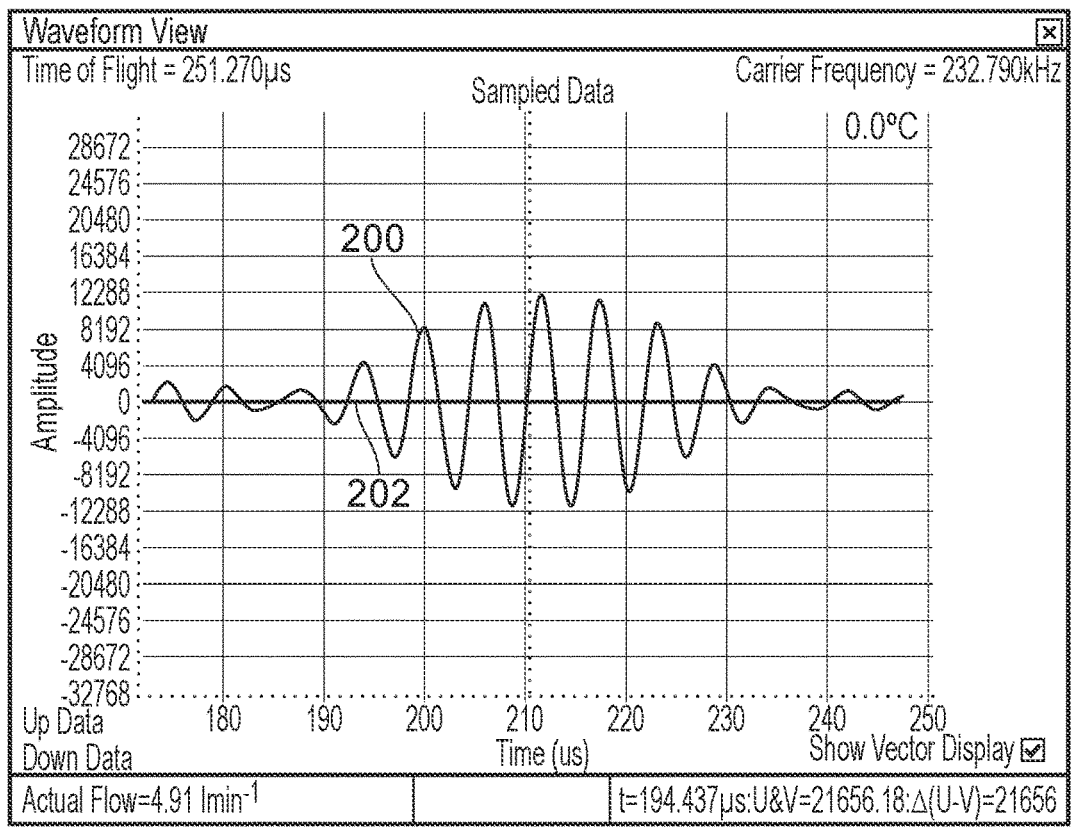
FIG. 2A shows a schematic of an ultrasonic ping signal detected under zero fluid flow according to an example.
Figure 2B:
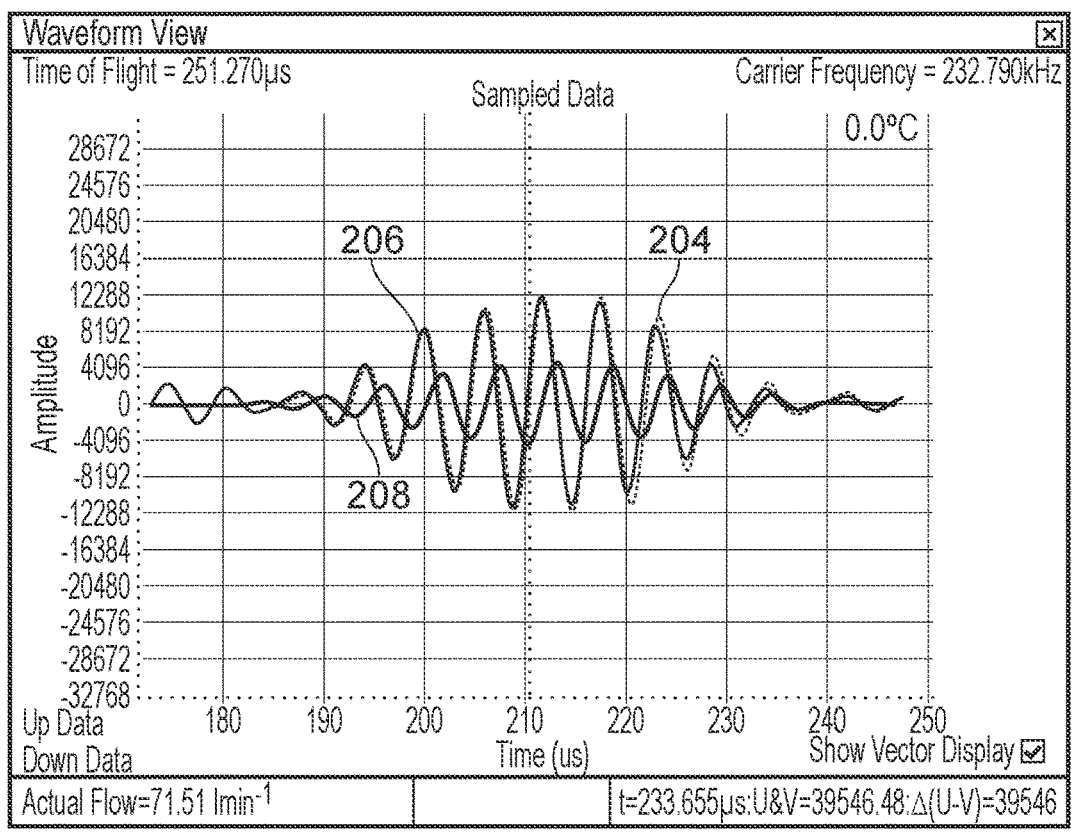
FIG. 2B shows a schematic of an ultrasonic ping signal detected under a flow of fluid through the conduit according to an example.

Referring now to FIGS. 2A and 2B, these examples correspond to the fluid-borne signal (i.e. clean signal without any interference) and, as such, are free from additional artefacts or noise from any conduit-borne signal(s).

FIG. 2A shows an example of an ultrasonic ping signal detected under zero fluid flow, as a function of amplitude and time. The detected signal 200 comprises a waveform with two traces: a first trace corresponding to the first signal, and a second trace corresponding to the second signal, where the first and second trace overlap (are coincident) due to the first and second signals being identical at zero flow. The processing module 140 can be configured to calculate a measure of the difference in the values of the amplitude and phase of the first signal and second signals at a selected time, which is shown as a difference signal 202. The difference signal is zero under zero fluid flow.

FIG. 2B shows an example of an ultrasonic ping signal detected under a flow of fluid through the conduit, as a function of amplitude and time. The detected signal comprises a waveform with two traces: a first trace 204 corresponding to the first signal, and a second trace 206 corresponding to the second signal, where the first and second trace have an amplitude and phase shift between them due to the first and second signals being measured under the flow of the fluid. As shown, there is a phase shift in both the first and second signals (in opposite directions due to the applied flow). The processing module 140 can be configured to calculate a measure of the difference in the values of the amplitude and phase of the first signal and second signals at a selected time, which is shown as a difference signal 208. The difference signal fluctuates according to the first and second signals with an amplitude related to flow. It can be seen that the amplitude of the difference signal is non-zero under the applied flow of fluid.

Figure 3A:
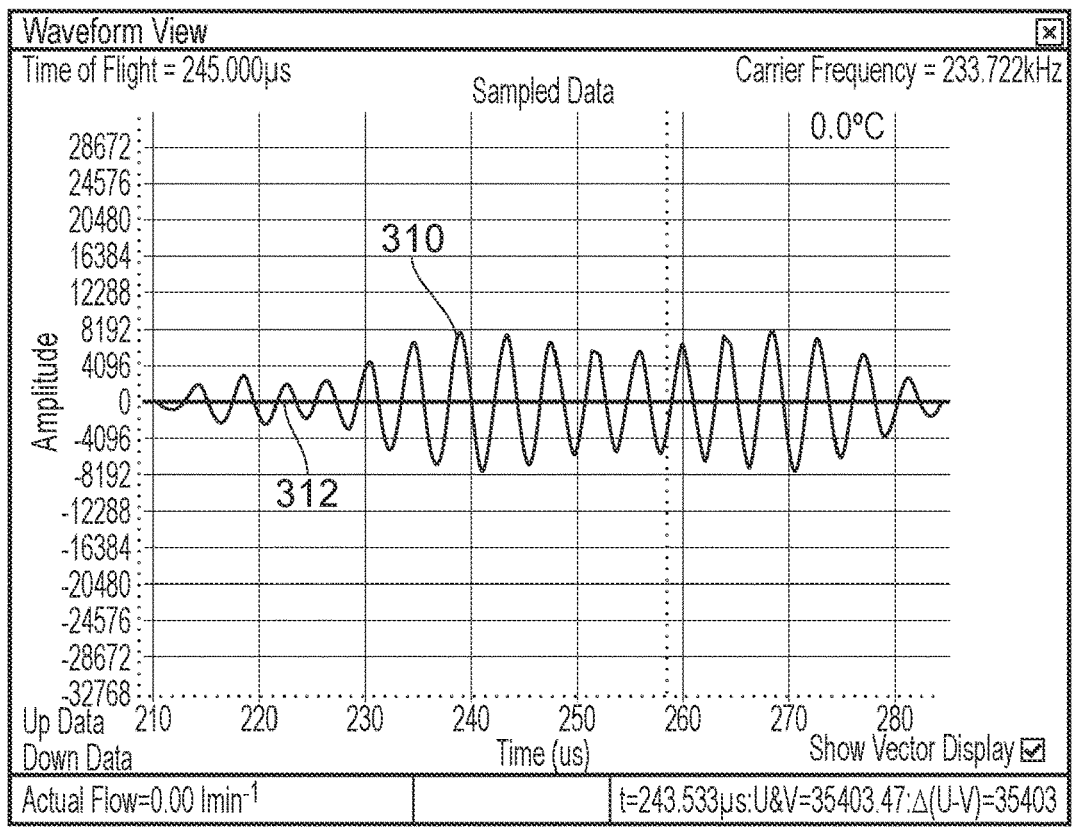
FIG. 3A shows a schematic of an ultrasonic ping signal for a fluid-borne signal and conduit-borne interference detected under zero fluid flow according to an example.
Figure 3B:
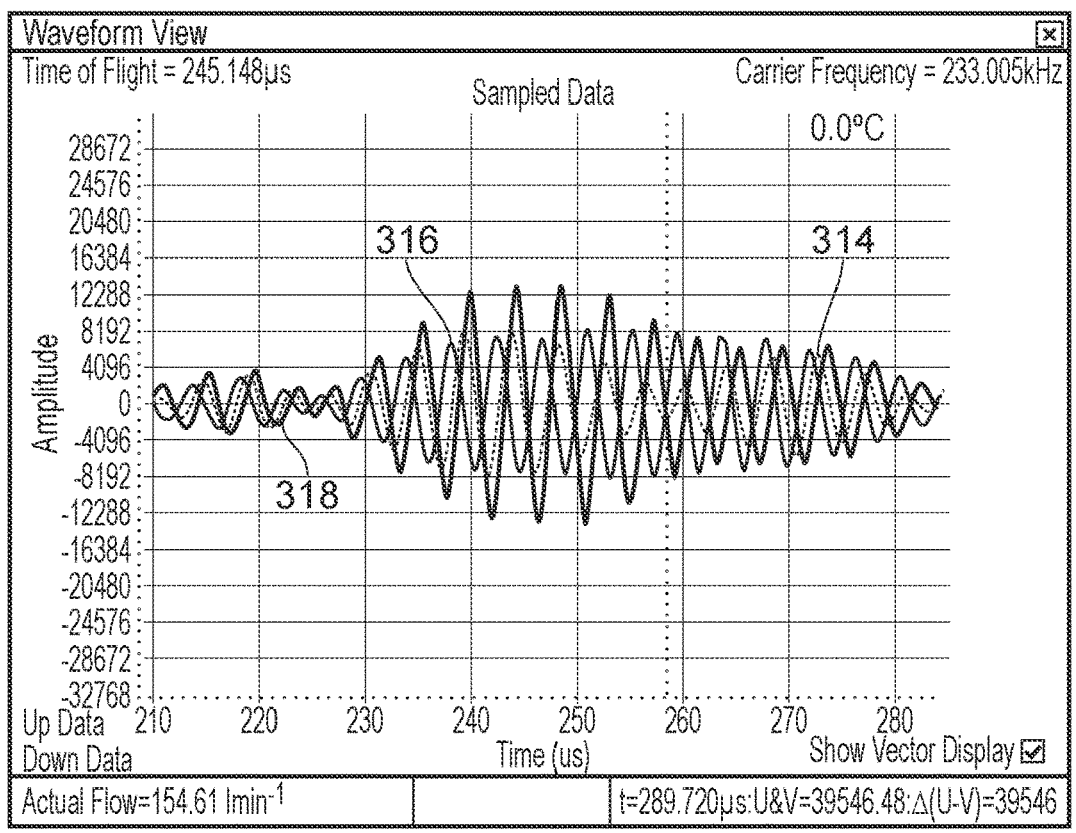
FIG. 3B shows a schematic of an ultrasonic ping signal detected for a fluid-borne signal and a conduit-borne interference signal under a flow of fluid through the conduit according to an example.

Referring now to FIGS. 3A and 3B, these examples correspond to the fluid-borne signal (pure or undistorted component) and the conduit-borne signal (distorted component), which includes additional artefacts or noise.

FIG. 3A shows an example of an ultrasonic ping signal for a fluid-borne signal and conduit-borne interference detected under zero fluid flow, as a function of amplitude and time. The detected signal 310 comprises a waveform with two traces: a first trace corresponding to the first signal, and a second trace corresponding to the second signal, where the first and second trace overlap (are coincident) due to the first and second signals being identical at zero flow. As shown, the detected first and second signals are compromised by interference originating from the conduit, seen as a modulating envelope wave function over the first and second traces. The effect of this interference or noise on the detected signal 310 is to vary the amplitude of the ping and contribute a ping which has come through the conduit rather than purely from the fluid. Since none of the media is dispersive, there is no assumed change in frequency and the effect is that of classical one-dimensional wave interference. The processing module 140 can be configured to calculate a measure of the difference in the values of the amplitude and phase of the first signal and second signals at a selected time, which is shown as a difference signal 312.

The difference signal is zero under zero fluid flow. FIG. 3B shows an example of an ultrasonic ping signal detected for a fluid-borne signal and a conduit-borne interference signal under a flow of fluid through the conduit, as a function of amplitude and time. The detected signal comprises a waveform with two traces: a first trace 314 corresponding to the first signal, and a second trace 316 corresponding to the second signal, where the first and second trace have an amplitude and phase shift between them due to the first and second signals being measured under the flow of the fluid. As shown, there is a phase shift in both the first and second signals (in opposite directions due to the applied flow). The processing module 140 can be configured to calculate a measure of the difference in the values of the amplitude and phase of the first signal and second signals at a selected time, which is shown as a difference signal 318. The difference signal fluctuates according to the first and second signals with an amplitude related to flow. It can be seen that the amplitude of the difference signal is non-zero under the applied flow of fluid. The relationship of the difference signal to the first and second signals is unclear due to the first and second signals having unequal amplitudes due to being distorted or affected by the conduit-borne interference signal.

The processor in the processing module 140 can be configured to generate respective measures of an amplitude and a phase of the first and second ultrasonic signals measured under a fluid flow, and respective measures of an amplitude and a phase of the third signal under zero flow. The respective measures are generated at a selected time in order to provide respective first, second and third flow vectors (that respectively correspond to the first, second and third signals). As such, it is possible to represent the detected first, second and third signals diagrammatically as vector quantities drawn on an Argand diagram, where their modulus and argument indicates the amplitude and phase of each respective signal.

According to an example, the flow vectors are represented on an Argand vector diagram, where the magnitude of each vector indicates an amplitude of the respective signal, and the direction of each vector indicates a phase of the respective signal.

The method for processing the detected signal in order to obtain flow vectors for representation on an Argand diagram will now be described.

The processor generates the respective measures of amplitude and phase of each of the detected signals using the following methodology. A complex analytic signal (equation 1 below) is provided from a sampled signal at a known carrier frequency using synchronous demodulation, i.e. the amplitude and phase of the detected first, second and third signals can be extracted and represented as phase vectors having real and imaginary components.

The detected signal is represented by:

$$P(t) \cdot \sin(2\pi f_c t + \varphi)$$

The complex version of the known carrier signal (having the ping carrier frequency of $f_c$) is represented by:

$$e^{-2\pi i f_c t}$$

The detected signal is multiplied by the complex version of the carrier signal:

$$D(t) = P(t) \cdot e^{i\omega_c t} \cdot \cos(\omega_c t + \varphi)$$

where
P(t) is the ping envelope,
ω is an arbitrary phase angle,
$f_c$ is the ping carrier frequency (and $\omega_c = 2\pi f_c$)
Applying Euler's formula:

$$D(t) = P(t) \cdot \cos(\omega_c t) \cdot \cos(\omega_c t + \varphi) + P(t) \cdot i \cdot \sin(\omega_c t) \cdot \cos(\omega_c t + \varphi)$$

Then applying sum identities to the phase offset φ:

$$D(t) = P(t) \cdot \cos(\omega_c t) \cdot \cos(\omega_c t) \cdot \cos(\varphi) - P(t) \cdot \cos(\omega_c t) \cdot \sin(\omega_c t) \cdot \sin(\varphi) + P(t) \cdot i \cdot \sin(\omega_c t) \cdot \cos(\omega_c t) \cdot \cos(\varphi) - P(t) \cdot i \cdot \sin(\omega_c t) \cdot \sin(\omega_c t) \cdot \sin(\varphi)$$

Then applying product-to-sum identities:

$$D(t) = P(t) \cdot \tfrac{1}{2}[1+\cos(2\omega_c t)] \cdot \cos(co) - P(t) \cdot \tfrac{1}{2} \cdot \sin(2\omega_c t) \cdot \sin(\varphi) + i \cdot P(t) \cdot \tfrac{1}{2} \cdot \sin(2\omega_c t) \cdot \cos(\varphi) - i \cdot P(t) \cdot \tfrac{1}{2} \cdot [1-d\cos(2\omega_c t)] \cdot \sin(\varphi)$$

Then applying a low-pass filter (to effectively remove terms $>\omega_c$):

$$D(t) = P(t) \cdot \tfrac{1}{2} \cdot \cos(\varphi) - i \cdot P(t) \cdot \tfrac{1}{2} \cdot \sin(\varphi) \qquad \text{Equation 1}$$

The complex function of equation 1 has real and imaginary components dependent on the phase relationship of the detected signal to the initial reference phase (i.e. known carrier frequency) used for the synchronous demodulation. This methodology gives a means of extracting the ping envelope P(t) regardless of the value of cp.

Then, changing from Cartesian co-ordinates to polar co-ordinates:

$$|D(t)| = \sqrt{\left[\left(P(t) \cdot \tfrac{1}{2} \cdot \cos(\varphi)\right)^2 + \left(P(t) \cdot \tfrac{1}{2} \cdot \sin(\varphi)\right)^2\right]} \qquad \text{Equation 2}$$

$$|D(t)| = \sqrt{\left(P(t)^2 \cdot \tfrac{1}{4} \cdot \cos(\varphi)^2 + P(t)^2 \cdot \tfrac{1}{4} \cdot \sin(\varphi)^2\right)}$$

$$|D(t)| = \sqrt{\left(P(t)^2 \cdot \tfrac{1}{4} \cdot (\cos(\varphi)^2 + \sin(\varphi)^2)\right)}$$

$$|D(t)| = \tfrac{1}{2} \cdot P(t)$$

Similarly:

$$\arg(D(t)) = \arctan\left(\frac{P(t) \cdot \tfrac{1}{2} \cdot \sin(\varphi)}{-P(t) \cdot \tfrac{1}{2} \cdot \cos(\varphi)}\right) \qquad \text{Equation 3}$$

$$\arg(D(t)) = \arctan\left(\frac{\sin(\varphi)}{\cos(\varphi)}\right) = \arctan(\tan(\varphi))$$

$$\arg(D(t)) = \varphi$$

Therefore, if the complex version of the known carrier signal is applied across the detected signals in the time domain (for discrete 8t) for any given phase offset, accurate values for both the phase and amplitude of the first and second signals can be obtained at time t (given by $\varphi_t$).

As such, the detected signals can be processed for representation on an Argand diagram. Examples of this signal processing for representation on Argand diagrams will now be described with reference to FIGS. 4A to 4D.

Figure 4A:
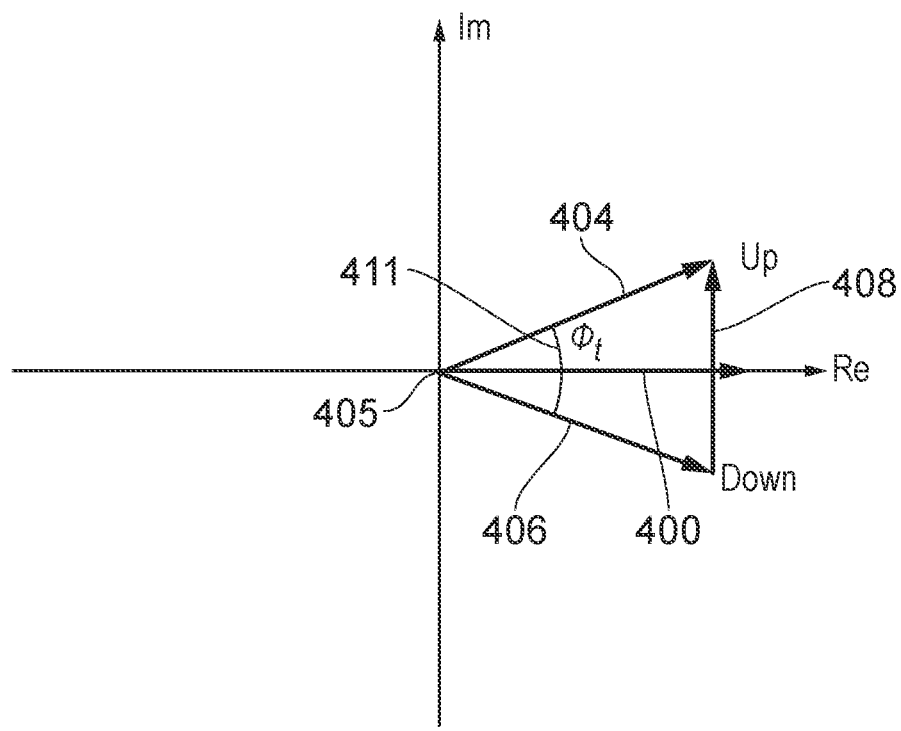
FIG. 4A shows a schematic of an argand diagram with phase vectors representing an ultrasonic ping signal detected under a zero flow and under a flow of fluid through the conduit according to an example.

FIG. 4A shows an example argand diagram with phase vectors representing an ultrasonic ping signal detected under a zero flow (for example, with reference to the signal shown in FIG. 2A) and detected under a flow of fluid through the conduit (for example, with reference to the detected signal shown in FIG. 2B). The first signal (under flow) is represented by phase vector 404. The second signal (under flow) is represented by phase vector 406. The third signal (zero flow) is represented by phase vector 400. The processor 104 can be configured to calculate a measure of the difference in the values of the amplitude and phase of the first signal and second signals (under flow) at the selected time using the first and second flow vectors, to provide a difference vector. Note that there is no phase difference vector for the third signal, since under zero flow the first and second signals are identical. The difference signal measured under flow is represented by the difference phase vector 408. The difference vector 408 is represented on the Argand diagram as being perpendicular to the real axis. The difference vector 408 indicates the phase difference between the first and second signals under flow. Note that the intersection of the difference vector 408 with the real axis indicates the phase difference at zero flow (i.e. there is no phase difference at zero flow).

According to an example, the axis of the first and second flow vectors can be arbitrarily aligned (where the first and second flow vectors 405 coincide), such that a zero flow is parallel to the real axis, i.e. zero flow can be represented as a zero flow vector pointing along the real axis 400. As such, the flow is indicated directly by the angle $\Phi_t$ between the first and second vectors: the greater the angle $\Phi_t$, the higher the rate of flow of the fluid through the conduit, and vice versa.

Figure 4B:
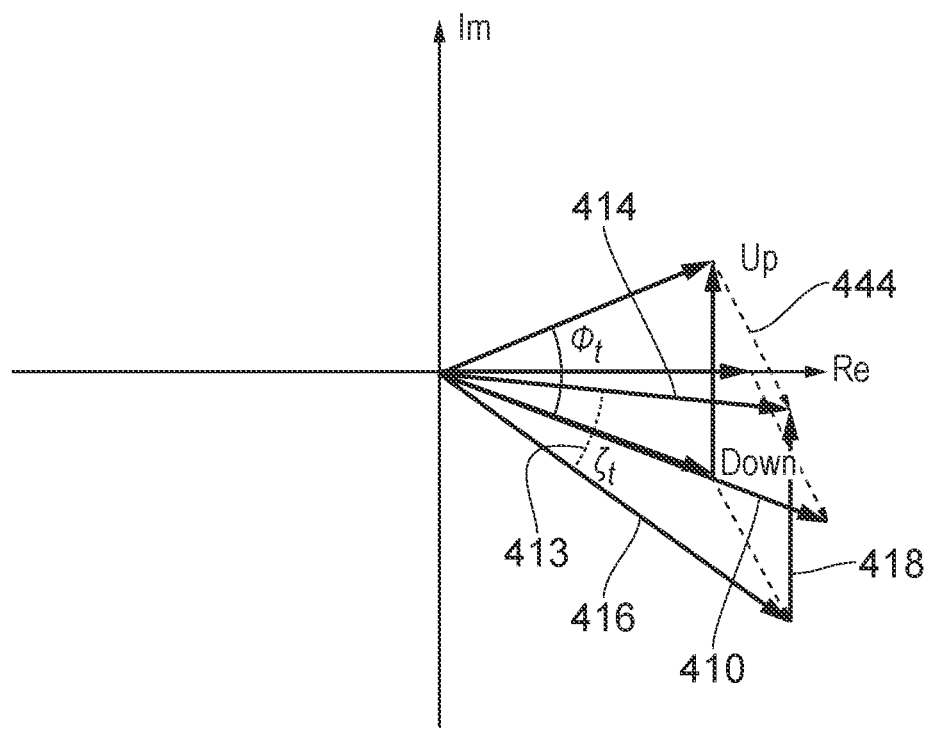
FIG. 4B shows a schematic of an argand diagram with phase vectors representing an ultrasonic ping signal detected under a zero flow and under a flow of fluid through the conduit, where the detected signals have been distorted due to an additive conduit-borne interference signal according to an example.

FIG. 4B shows an example argand diagram with phase vectors representing an ultrasonic ping signal detected under a zero flow (for example, with reference to the signal shown in FIG. 3A) and under a flow of fluid through the conduit (for example, with reference to the signal shown in FIG. 3B), where the detected signals have been distorted due to an additive conduit-borne interference signal. It is assumed that the conduit-borne signal has the same frequency as the pure fluid signal. The distorted first, second and third signals that are detected are represented on the Argand vector diagram as flow vectors having a corresponding amplitude and phase. The first distorted signal (under flow) is represented by phase vector 414. The second signal (under flow) is represented by phase vector 416. The third signal (zero flow) is represented by phase vector 410. Similarly, as before, the axis of the first and second flow vectors can be arbitrarily aligned.

It can then be seen in FIG. 4B that the detected signals, in the presence of conduit-borne interference, are affected by the conduit-borne interference signal so as to be offset or distorted by an amount 'M' 444.

For example, the detected vector at zero flow is distorted by the interference signal, such that it has moved away from the real axis. Applying some geometric constructions, the following observations of this model can be made:

- The length of the distorted first and second flow vectors (414, 416) represent the amplitude of the distorted first and second signals (314, 316) and these are detected as having differing amplitudes. This will be the case unless the interference vector (yet to be derived) is parallel to the zero flow vector 410. This geometric construction is confirmed by observation.
- The detected phase shift 413 (represented by $\xi_t$) is not equal to the correct phase shift 411 (represented by $\Phi_t$) and therefore cannot be directly related to flow. This geometric construction is confirmed by observation.
- The zero flow vector 410 is similarly distorted by the conduit-borne interference.
- The distorted difference vector 418 is unaffected by the conduit-borne interference (in both phase and amplitude).

Using the above observations and geometric constructions (as will be described as follows), the offset 'M' 444 of the interference signal can be determined, i.e. the amount of distortion created by the presence of the conduit-borne interference can be determined.

Figure 4C:
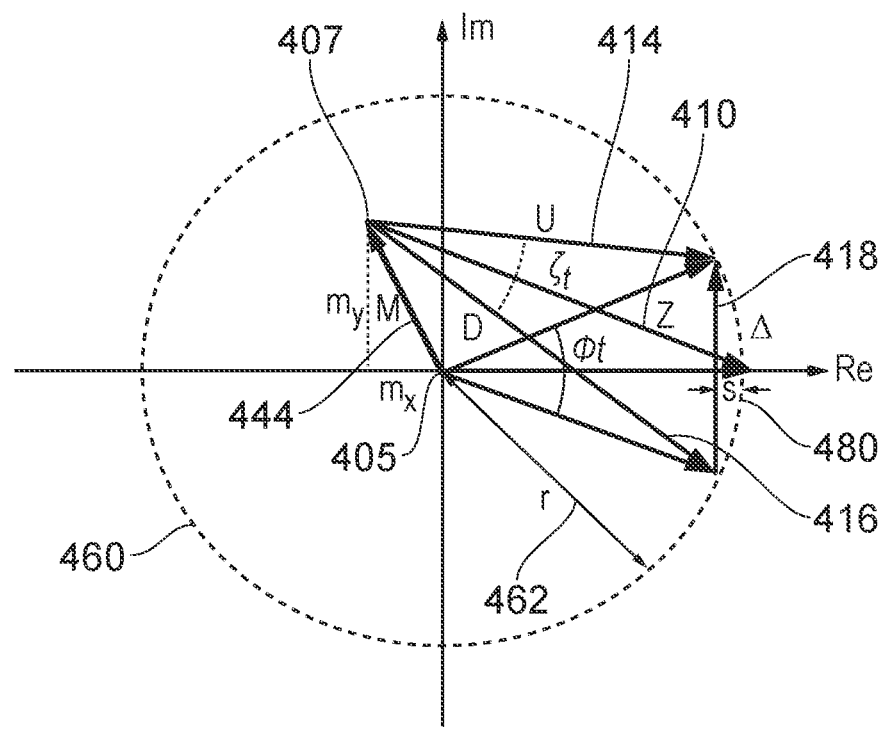
FIG. 4C shows a schematic of an argand diagram with distorted phase vector relationships having their origin translated according to conduit-borne Interference according to an example.

In order to take this analysis further, referring to FIG. 4C, the point of reference 407 for the distorted flow vectors may be changed (for ease of visual reference to the Argand diagrams) by inverting the interference vector 444 (now no longer dashed) and applying it to the origin of the distorted signal vectors. This is shown geometrically in FIG. 4C. Additionally, a circle 460 has been drawn around the origin 405 of the pure fluid vectors, with radius r 462 equal to the amplitude of the pure fluid signal vectors (i.e. without conduit-borne interference). This radius is effectively the locus of the endpoints of the pure fluid signals from zero flow, where the angle $\Phi_t$ 411 widens as flow increases.

The interference vector 'M' 444 of the interference signal comprises a real $m_x$ and imaginary $m_y$ component.

Figure 4D:
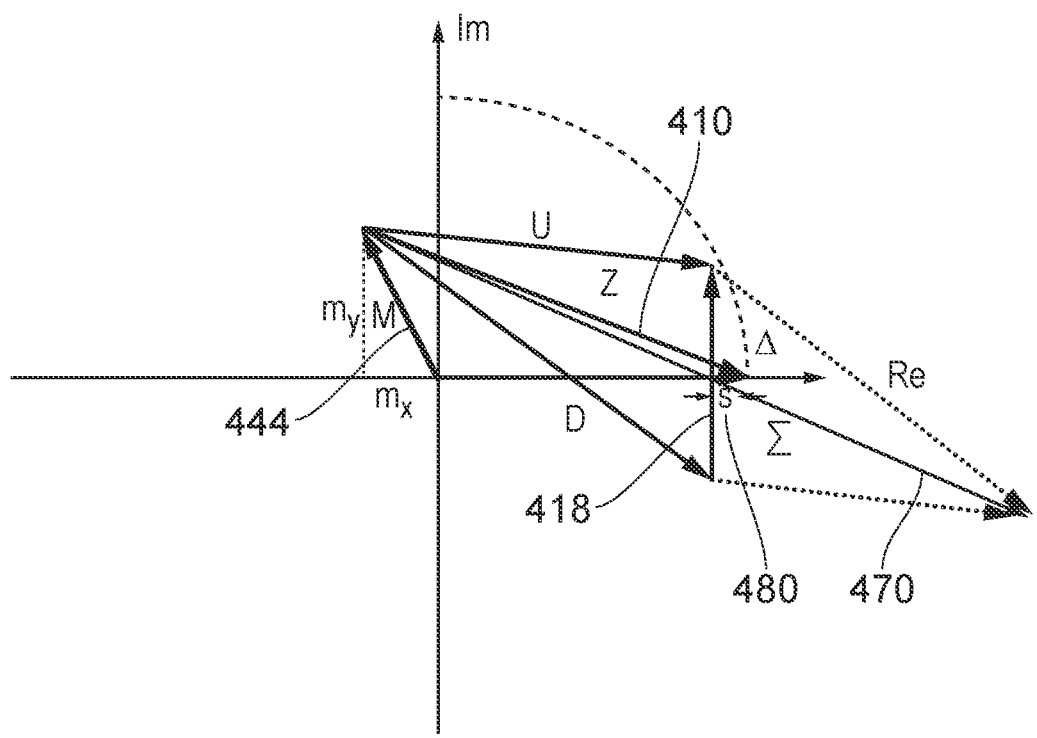
FIG. 4D shows a schematic of an argand diagram for distorted phase vector relationships used to determine a quantity referred to as sagitta s, and an average vector according to an example.

Pythagoras theorem can be applied to the distorted flow vectors to determine the first 414 (U), second 416 (D) and third 410 (Z) flow vector amplitudes:

$$Z^2 = (r+m_x)^2 + m_y^2 \qquad \text{Equation 4}$$

where Z is the third flow vector 410 (distorted zero flow), $$U^2 = (r + m_x - s)^2 + \left(m_y - \frac{\Delta}{2}\right)^2 \qquad \text{Equation 5}$$

where U is the distorted first flow vector 414, and s is sagitta 480 (which, with reference to FIG. 4D, is equal to the difference between the average vector halved ($\Sigma/2$) and the distorted third vector 410 under zero flow (Z), and where the value of sagitta s 480 is represented by equation 8 shown later), and $\Delta$ is the difference vector 418. Furthermore:

$$D^2 = (r + m_x - s)^2 + \left(m_y + \frac{\Delta}{2}\right)^2 \qquad \text{Equation 6}$$

where D is the distorted second flow vector 416.

Combining equations 5 and 6 allows a determination of the imaginary component $m_y$ of the interference vector 444:

$$U^2 - D^2 = \left(m_y - \frac{\Delta}{2}\right)^2 - \left(m_y + \frac{\Delta}{2}\right)^2$$

Such that:

$$|U|^2 - |D|^2 = m_y^2 - m_y\Delta + \frac{\Delta^2}{4} - m_y^2 - m_y\Delta - \frac{\Delta^2}{4} \qquad \text{Equation 7}$$

$$|U|^2 - |D|^2 = -2m_y\Delta$$

$$m_y = -\frac{|U|^2 - |D|^2}{2\Delta}$$

It can be observed that the imaginary component $m_y$ of the interference vector 444, as represented by equation 7, is not dependent on flow (however, it is observed to be undefined at zero flow). In practical terms, this means that the value of the imaginary component $m_y$ (for a given time, t) may be averaged over time regardless of flow.

As such, the processor 140 can be configured to generate a measure for a component ($m_y$) of an interference vector 'M' 444 representing a conduit-borne component signal of the first and second distorted signals 314, 316, using the first and second distorted flow vectors 414, 416 and the difference vector 418.

As will now be described, the processor 140 can be configured to generate a measure for the flow rate of the fluid using the component $m_y$ of the interference vector 'M' 444, the third distorted flow vector 410 and the sum of the first and second distorted vectors 414, 416.

FIG. 4D shows an example Argand diagram for distorted phase vector relationships used to determine a quantity referred to as sagitta s 480, and an average vector E 470, where the average vector $\Sigma$ 470 corresponds to the sum of the first and second distorted vectors 414, 416. This average vector 470 is the addition of the first and second vectors (i.e. sum of the first and second distorted signals). The average vector 470 passes through the intersection of the difference vector 418 with the real axis, where this relationship follows from a parallelogram formed by translating the origin of the distorted first and second vectors, such that the average vector 470 and the difference vector 418 bisect the area thus formed. Also shown in FIG. 4D is the quantity sagitta s 480, which is equal to the difference between the average vector halved (Σ/2) and the distorted third vector 410 under zero flow (Z). The value of sagitta s 480 is represented by:

$$s = \sqrt{|Z|^2 - m_y^2} - \sqrt{\left(\frac{|\Sigma|}{2}\right)^2 - m_y^2} \qquad \text{Equation 8}$$

where $m_y$ is the imaginary component of the interference vector 'M' 444.

As such, the flow $\Phi_t$ (for the pure fluid signal having removed the effects of the conduit-borne interference) may be given directly by (with reference to FIGS. 4C and 4D):

$$\Phi_t = 4.\arctan\left(\frac{2s}{\Delta}\right) \qquad \text{Equation 9}$$

In practice, however, these calculations are sensitive since a small error in either |Z| or |Σ| leads to a far greater error in s and thence $\Phi_t$. Moreover, as the value of s is flow dependent, it may not be refined by averaging over time.

A preferred (less sensitive) approach, may be found by calculating the radius r 462 from the sagitta s 480 using the formula for the radius of an arc:

$$r = -\frac{s^2 - \left(\frac{|\Delta|}{2}\right)^2}{2s} \qquad \text{Equation 10}$$

This value for r may be averaged over time. The flow $\Phi_t$ can then be computed from the difference vector Δ 418 and the radius r.

The derivations described herein imply that the two quantities $m_y$ and r can be calculated from the amplitude values U, D and Z obtained via flow vectors representing the detected first, second and third signals.

Further, $m_y$ and r can be averaged over time for a more accurate determination of flow since these values are independent of flow (as second order effects are ignored according to the listed assumptions above).

Accordingly, derived values for flow have been calculated and compared to actual flow rates that have been measured, and the linearity in these measurements reveals a sufficiently accurate, derived determination of flow. Further, the use of the Argand vector diagram representations (from the calculations) show the expected pure fluid flow behaviour.

Some example experimental measurements which use this signal processing method will now be described.

FIGS. 5-7 are examples waveforms and Argand diagrams of experimentally detected flow rates for a fluid flowing through a conduit, supporting the described derivation for determining the flow.

A Windows program was written in Delphi to perform the following:
a) Process the captured data sets,
b) Show waveforms and demodulated waveforms for detected first (Up), second (Down), and difference signals,
c) Use a centre of gravity algorithm to derive a time of flight from the difference signal,
d) Calculate filters and display: the third flow vector (zero flow vector), the imaginary component $m_y$ of the conduit-borne signal, and the radius r (i.e. pure fluid amplitude),
e) Provide vector displays for all of the above, and
f) Calculate the flow and compare this to the actual flow log.

Figure 5A:
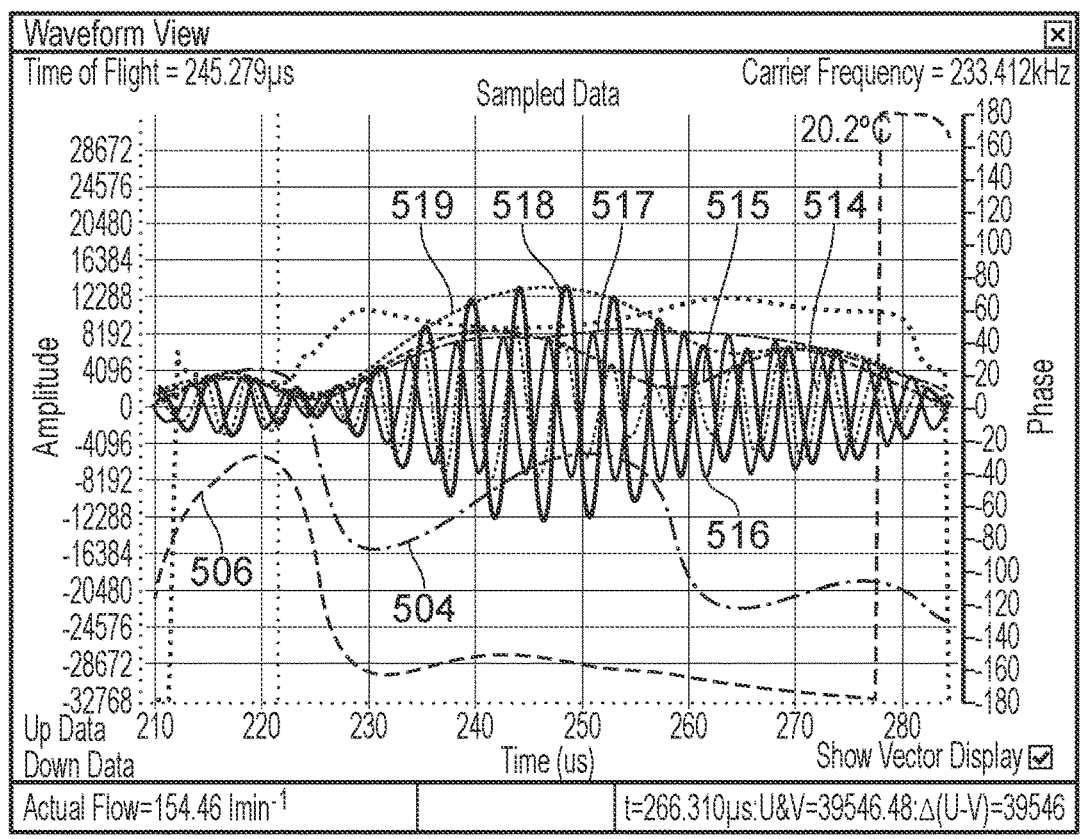
FIG. 5A shows a schematic of detected first, second and difference signals, along with demodulated plots for the detected first, second and difference signals according to an example.

FIG. 5A shows detected first 514, second 516 and difference 518 signals, along with magnitudes of the demodulated plots for the detected first 515, second 517 and difference signals 519 relating to the amplitude axis on the left-hand side, according to an example. The magnitudes for the demodulated plots 515, 517 and 519 are found using equation (2) at a carrier frequency of around 233 kHz. The phase of derived pure signals 504, 506 are found using equation (3) and are shown relating to the phase axis on the right-hand side.

Figure 5B:
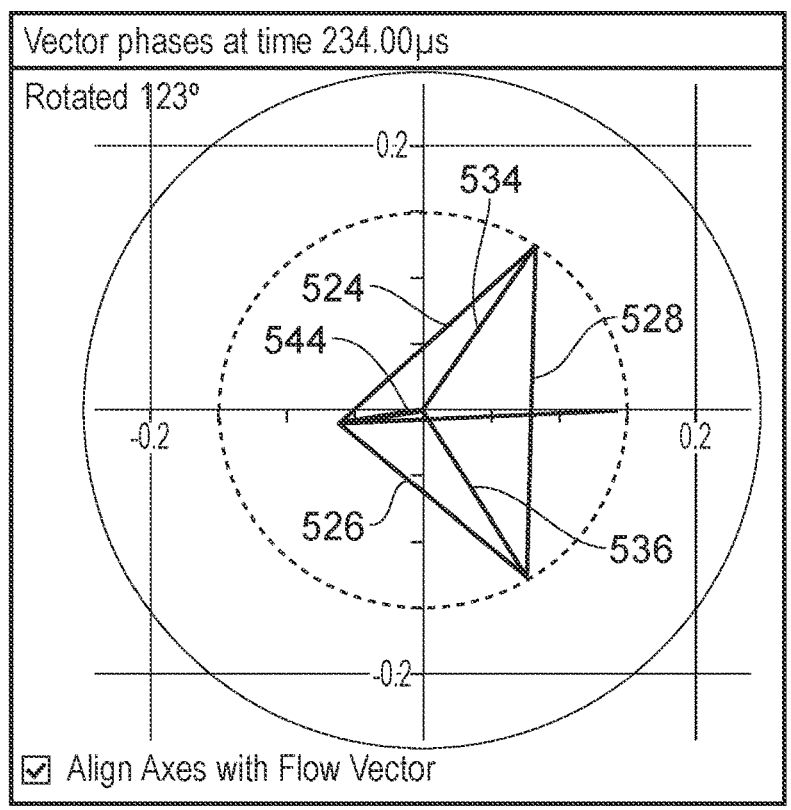
FIG. 5B shows a schematic for vector phase plots corresponding to detected signals and derived signals at a time of 234 μs according to an example.

FIG. 5A maps onto FIG. 5B which is has been rotated and modified (as described above) for visual ease of recognition.

FIG. 5B shows vector phase plots corresponding to the detected signals and derived signals at a time of 234 μs according to an example. The distorted flow vectors are shown for: the first flow vector 524 corresponding to the detected first signal 514; the second flow vector 526 corresponding to the detected second signal 516; and difference vector 528. The derived pure fluid signals 504, 506 are determined using the interference vector 'M' 544 to compensate for the conduit-borne interference component signal, according to the derived first pure (undistorted) vector 534 and derived second pure (undistorted) vector 536.

Figure 6A:
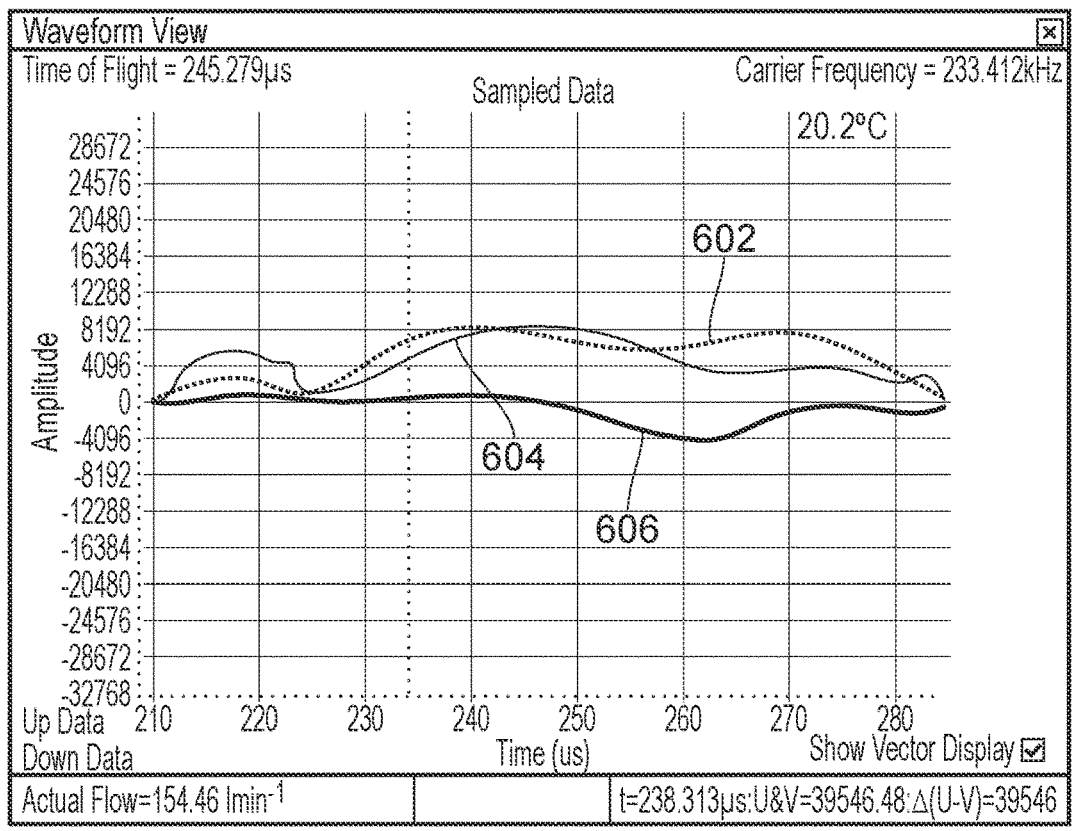
FIG. 6A shows demodulated plots for the zero flow vector, the radius and the interference vector according to an example.

FIG. 6A shows demodulated plots for the zero flow vector 602 (using equation 4), the radius r 604 (using equation 10) and the imaginary component of the interference vector $m_y$ 606 (using equation 7) according to an example.

Figure 6B:
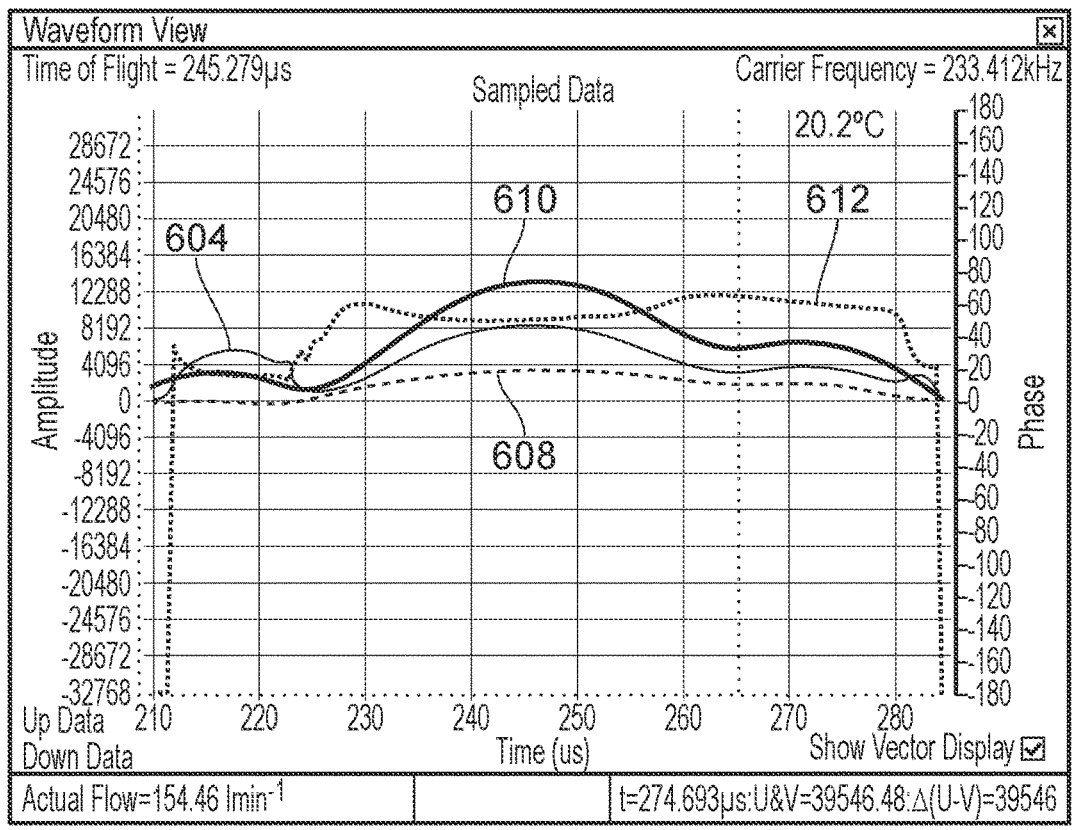
FIG. 6B shows demodulated plots for the sagitta, difference vector and phase according to an example.

FIG. 6B shows demodulated plots for the sagitta s 608 (using equation 8), the radius r 604 (using equation 10), and the difference vector 610 relating to the amplitude axis on the left-hand side, and the flow $\Phi_t$ 612 (using equation 9) relating to the phase axis on the right-hand side according to an example.

Figure 7A:
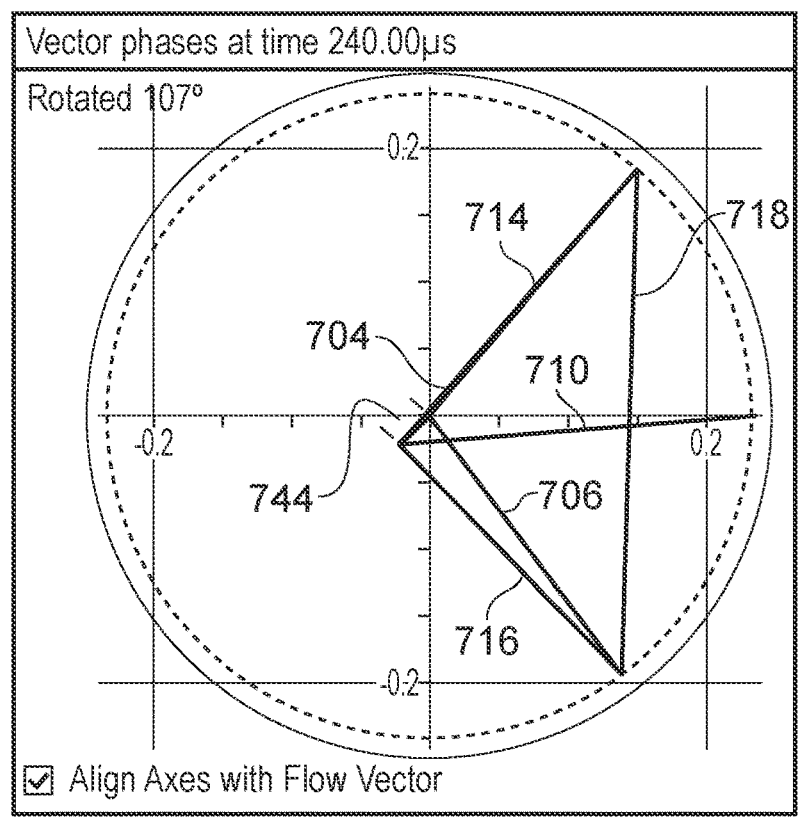
FIG. 7A shows vector phase plots corresponding to the detected signals and derived signals at a time of 240 μs according to an example.
Figure 7B:
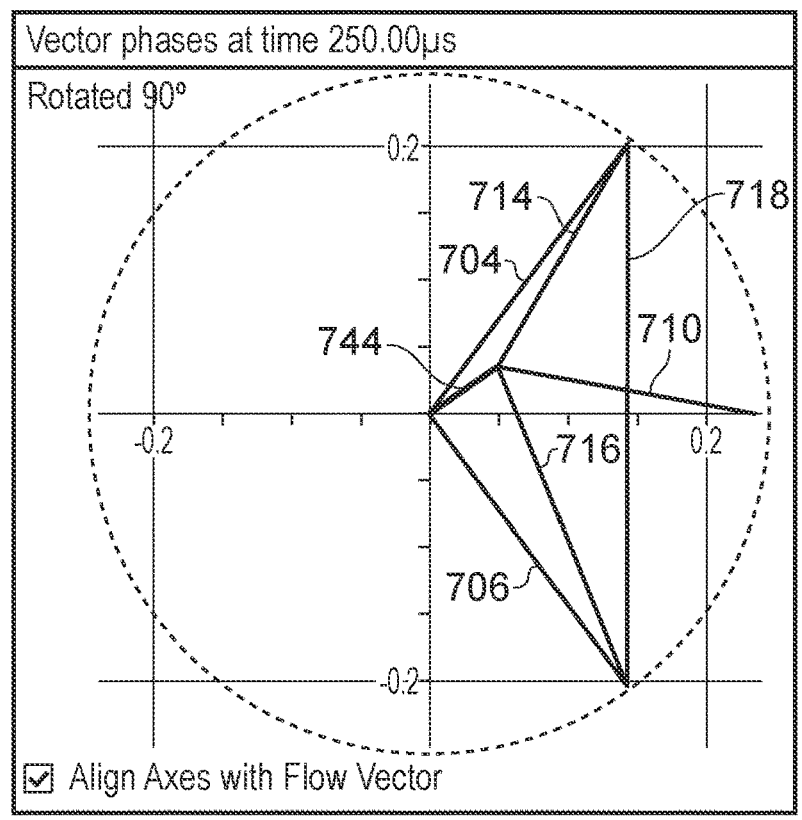
FIG. 7B shows vector phase plots corresponding to the detected signals and derived signals at a time of 250 μs according to an example.
Figure 7C:
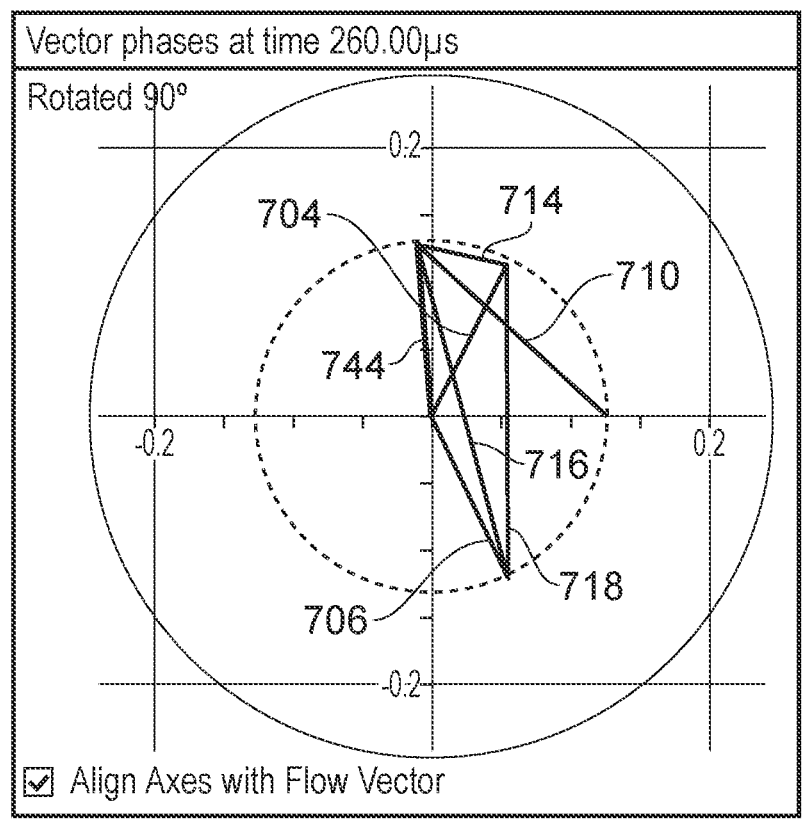
FIG. 7C shows vector phase plots corresponding to the detected signals and derived signals at a time of 260 μs according to an example.

FIGS. 7A-7C show vector phase plots implemented using equations 9 and 10 at a selected time. These vector phase plots show vector phase plots corresponding to the first (U) and second (D) detected signals (under flow/distorted) respectively 714, 716 and first and second derived signals respectively 704, 706. The (distorted) difference vector Δ 718 for each of the detected and derived signals is shown to be overlapping. The interference vector "M" 744 is also shown. The third signal (Z) is shown by the zero flow phase vector 710.

FIG. 7A shows vector phase plots corresponding to the detected signals and derived signals at a time of 240 μs according to an example. FIG. 7B shows vector phase plots corresponding to the detected signals and derived signals at a time of 250 μs according to an example. FIG. 7C shows vector phase plots corresponding to the detected signals and derived signals at a time of 260 μs according to an example.

In a case in which conduit/pipe-borne noise is eliminated, for example by acoustically engineering a flow meter structure so that the effects of such noise are minimal, it is possible to determine a measure for the flow rate of a liquid in a conduit using the phase difference angle $\Phi_t$ directly. That is, according to an example, assuming the noise offset vector to be zero, $\Phi_t$ may be determined by calculating the difference between the angles of the measured up and down vectors.

Referring to equation 3 noted above, the phases of an up signal ($\phi_u$) and a down signal ($\phi_d$) can be determined. Referring to FIG. 4B in which the vectors are shown rotated and aligned symmetrically about the real axis, the value $\Phi_t$ may be calculated directly as: $\Phi_t = \phi_u - \phi_d$.

In other words, if pipe borne information is ignored, then in FIG. 4B vector 444 is zero and $\Phi_t$ equals $\zeta_r$. Accordingly, FIG. 4b conflates to become FIG. 4A.

In an example, pipe-borne interference may be removed using the vector analysis methods described above (e.g. using a real time graphical display) to set up preferred oscillation modes on a given transducer arrangement for a flow meter so as to minimise interference on the received signal. Furthermore, it is possible to change materials (e.g. axially along the length of the conduit in question) to reduce transmission of interference, and configure a flow meter to reduce internal and external reflections at critical acoustic distances to prevent "rattling". It is also possible to apply tube damping by various means.

As described above, examples enable a digital representation of vector quantities to be generated, which in turn enable calculation of vector angles at any point in time on a waveform representing a signal.

According to an example, and by way of reference to FIGS. 5, 6 and 7, the vectors provide phase and magnitude information throughout a received signal window and provide a value of $\phi_t$ which can be used to determine flow graphically at the appropriate parts of the signal in the time domain. The vectors (or their graphical representation) thus provide direct indications of whether pipe-borne (or any other) interference exists in the system. With reference to FIG. 5B for example, the vectors 534 and 536 (in which interference is absent) can therefore be directly used to determine a measure of flow rate.

In an example, it is therefore possible to use the vector analysis and the associated display of phase angles throughout the waveform as a tool to asses and tune a system to minimise interference effects.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method for determining a flow rate, $\Phi t$, of a fluid in a conduit (105), the method comprising:
providing a first ultrasonic transit time signal (115, 204, 314) under fluid flow, generated using a first transducer (110) in a direction towards a second transducer (120);
providing a second ultrasonic transit time signal (125, 206, 316) under fluid flow, generated using the second transducer (120) in a direction towards the first transducer (110), the first and second transducers (110, 120) being spatially separated from one another along a length of the conduit (105);
providing a third ultrasonic transit time signal (200, 310) under zero fluid flow, generated using the first or second transducer (110, 120) in a direction towards the second or first transducer (120, 110) respectively;
generating respective measures of amplitude and phase of the first (115, 204, 314), second (125, 206, 316) and third signals (200, 310) at a selected time to provide respective first, U (414), second, D (416) and third, Z (410), flow vectors;
calculating a measure of the difference in the values of amplitude and phase of the first signal (115, 204, 314) and second signal (125, 206, 316) at the selected time using the first and second flow vectors (414, 416) to provide a difference vector, $\Delta$ (418);
generating a measure for a component, $m_y$, of an interference vector, M (444), representing a conduit-borne component signal (150) of the first and second signals (115, 125) using the first and second flow vectors (414, 416) and the difference vector, $\Delta$ (418); and
generating a measure for the flow rate, $\Phi t$, of the fluid using the component, $m_y$, of the interference vector, M (444), the third flow vector, Z (410), and the sum, $\Sigma$ (470), of the first and second vectors (414, 416).

2. A method according to claim 1, wherein generating the measure for the flow rate, $\Phi t$, of the fluid further uses the difference vector, $\Delta$ (418).

3. A method according to claim 1, wherein the first and/or second signal (115, 125) comprises the conduit-borne component signal (150) and a pure fluid component (400, 404, 406).

4. A method according to claim 3, wherein the conduit-borne component signal (150) corresponds to an ultrasonic wave that has propagated through the conduit (105) itself and has not propagated through the fluid.

5. A method according to claim 3, wherein the pure fluid component (400, 404, 406) corresponds to an ultrasonic wave that has propagated through the fluid within the conduit.

6. A method according to claim 1, wherein the third flow vector, Z (410), comprises a pure fluid component (400, 404, 406) and no conduit-borne component signal (150).

7. A method according to claim 1, wherein the difference vector, $\Delta$ (418), indicates the flow rate, $\Phi t$, of fluid in the conduit (105) affected by the conduit-borne component signal (150).

8. A method according to claim 1, wherein generating a measure for the component, $m_y$, of the interference vector, M (444), comprises the equation:

$$m_y = -\frac{|U|^2 - |D|^2}{2\Delta}$$

where
$m_y$ is the component of the interference vector, M (444)
U is the first flow vector (414)
D is the second flow vector (416), and
$\Delta$ is the difference vector (418).

9. A method according to claim 1, wherein generating a measure for the flow rate, $\Phi t$, of the fluid comprises the equation:

$$s = \sqrt{|Z|^2 - m_y^2} - \sqrt{\left(\frac{|\sum|}{2}\right)^2 - m_y^2}$$

where
Z is the third flow vector (410)
$m_y$ is the imaginary component of the interference vector, M (444)

Σ is a sum vector passing through the intersection of the difference vector (418) with the real axis, and s is a sagitta (480) equal to the difference between the sum vector Σ/2 and the third flow vector (410).

10. A method according to claim 1, wherein generating a measure for the flow rate, Φt, of the fluid comprises the equation:

$$\Phi_t = 4 \cdot \arctan\left(\frac{2s}{\Delta}\right)$$

where

Δ is the difference vector (418), s is a sagitta (480) equal to the difference between a sum vector Σ/2 and the third flow vector (410), wherein the sum vector Σ (470) passes through the intersection of the difference vector (418) with the real axis, and Φt is the flow rate of the fluid.

11. A method according to claim 1, wherein generating a measure for the flow rate, Φt, of the fluid comprises the equation:

$$r = -\frac{s^2 - \left(\frac{|\Delta|}{2}\right)^2}{2s}$$

where

Δ is the difference vector (418), s is a sagitta (480) equal to the difference between a sum vector Σ/2 and the third flow vector (410), and r is a radius (462) linked with the sagitta (480), where the radius (462) represents an amplitude of the fluid flow.

12. A method according to claim 1, further comprising performing synchronous demodulation on the first signal and/or second signal (115, 125).

13. An apparatus for determining a flow rate, Øt, of a fluid in a conduit, the apparatus comprising:

a conduit (105);

a first transducer (110) configured to provide a first ultrasonic transit time signal (115, 204, 314);

a second transducer (120) configured to provide a second ultrasonic transit time signal (125, 206, 316), wherein the first a second transducers (110, 120) are spatially separated from one another along a length of the conduit (105) and are further configured to provide a third ultrasonic transit time signal (200, 310);

a signal generator (130);

a processor (140), configured to:
  generate respective measures of amplitude and phase of the first (115, 204, 314), second (125, 206, 316) and third signals (200, 310) at a selected time to provide respective first (414), second (416) and third flow vectors (410);
  calculate a measure of the difference in the values of amplitude and phase of the first signal (115, 204, 314) and second signal (125, 206, 316) at the selected time using the first and second flow vectors (414, 416) to provide a difference vector, Δ (418);
  generate a measure for a component, $m_y$, of an interference vector, M (444), representing a conduit-borne component signal (150) of the first and second flow signals (115, 125) using the first and second flow vectors (414, 416) and the difference vector, Δ (418); and
  generate a measure for the flow rate, Φt, of the fluid using the component, $m_y$, of the interference vector, M (444), the third flow vector, Z (410), and the sum, Σ (470), of the first and second vectors (414, 416).

14. A non-transitory machine-readable storage medium encoded with instructions executable by a processor for determining a flow rate, Φt, of a fluid in a conduit, the machine-readable storage medium comprising instructions to:

generate, using a first transducer (110), and in a direction towards a second transducer (120), a first ultrasonic transit time signal (115, 204, 314) under fluid flow;

generate, using the second transducer (120), and in a direction towards the first transducer (110), a second ultrasonic transit time signal (125, 206, 316) under fluid flow, wherein the first and second transducers (110, 120) are spatially separated from one another along a length of the conduit (105);

generate a third ultrasonic transit time signal (200, 310) under zero fluid flow using the first or second transducer (110, 120) in a direction towards the second or first transducer (120, 110) respectively:

generate respective measures of an amplitude and phase of the first (115, 204, 314), second (125, 206, 316) and third (200, 310) ultrasonic transit time signals (200, 310) at a selected time to provide respective first (414), second (416) and third flow vectors (410);

calculate a measure of the difference in the values of amplitude and phase of the first ultrasonic transit time signal (115, 204, 314) and second ultrasonic transit time signal (125, 206, 316) at the selected time using the first and second flow vectors (414, 416) to provide a difference vector, Δ (418);

generate a measure for a component, $m_y$, of an interference vector, M (444), representing a conduit-borne component signal (150) of the first and second ultrasonic transit time signals (115, 125) using the first and second flow vectors (414, 416) and the difference vector, Δ (418); and generate a measure for the flow rate, Φt, of the fluid using a component, $m_y$, of an interference vector, M (444), the third flow vector, Z (410), and a sum, Σ (470), of the first and second vectors (414, 416).

15. A method for determining a flow rate of a fluid in a conduit, the method comprising:

detecting a first ultrasonic transit time signal under fluid flow, generated using a first transducer in a direction towards a second transducer;

detecting a second ultrasonic transit time signal under fluid flow, generated using the second transducer in a direction towards the first transducer, the first and second transducers being spatially separated from one another along a length of the conduit;

determining a measure of a difference in the values of the amplitude and the phase between the first and second ultrasonic transit time signals at a selected time;

generating a measure for at least one component of an interference vector, M, representing a conduit-borne component signal of the first and second ultrasonic transit time signals using: the measure of the difference in the values of the amplitude and the phase between the first and second ultrasonic transit time signals at the selected time, and first and second flow vectors, wherein the first and second flow vectors are generated on the basis of the first and second ultrasonic transit time signals; and on the basis of the determined measure of difference in the values of the amplitude and the phase and the generated measure for the at least one component of the interference vector, determining the flow rate of the fluid.

16. The method as claimed in claim 15, further comprising:
   generating a representation of phase of a signal at the selected time; and
   using the representation, calculating a measure of the flow rate at the selected time.

17. The method as claimed in claim 15, further comprising:
   sampling the first and second signals at the selected time to provide first and second samples; and
   using the first and second samples, calculating measures for the phase of the first and second signals at the selected time.

* * * * *